United States Patent [19]
Wachs et al.

[11] 3,810,255
[45] May 7, 1974

[54] FREQUENCY TRANSLATION ROUTING COMMUNICATIONS TRANSPONDER

[75] Inventors: Marvin Richard Wachs, Rockville; Arnold L. Berman, Kensington; Christoph E. Mahle, Rockville, all of Md.

[73] Assignee: Communications Satellite Corporation, Washington, D.C.

[22] Filed: June 10, 1971

[21] Appl. No.: 151,656

[52] U.S. Cl. .......................... 325/3, 325/9, 343/18 B, 343/100 ST
[51] Int. Cl. .......................... H04b 1/59, H04b 1/66
[58] Field of Search .......................... 325/4, 9, 11, 14; 343/6.8 R, 6.8 LC, 18 B, 100 ST; 325/4, 9, 11, 14; 324/77 E

[56] References Cited

UNITED STATES PATENTS

| | | | |
|---|---|---|---|
| 3,273,151 | 9/1966 | Cutler et al. | 325/4 X |
| 3,541,553 | 11/1970 | Gubin | 343/100 ST |
| 2,848,545 | 8/1958 | Mitchell | 325/9 X |
| 3,314,067 | 4/1967 | Rutz | 325/14 |
| 3,045,185 | 7/1962 | Mathwich | 325/9 X |
| 3,196,438 | 7/1965 | Kompfner | 343/100 ST |

*Primary Examiner*—Malcolm F. Hubler
*Attorney, Agent, or Firm*—Alan J. Kasper, James W. Johnson, Jr., Sughrue, Rothwell, Mion, Zinn & Macpeak

[57] ABSTRACT

Frequency bands in spot beams received by a satellite transponder are routed to transmitted spot beams. Every band in all received beams are frequency translated into separate bands within the transponder. The separate bands result in a total bandwidth within the transponder equal to the number of received spot beams times the bandwidth of each spot beam. The total bandwidth is then divided among the transmitters — each divided portion being reconverted into the transmitter bandwidth. Routing of a single receive band is accomplished by mixing the band with a local oscillator signal having a frequency whose value causes the mixer output to assume a particular band within the total bandwidth — the particular band being diverted to the transmitted spot beam of interest.

5 Claims, 2 Drawing Figures

INVENTORS
MARVIN R. WACHS
ARNOLD L. BERMAN
CHRISTOLPH E. MAHLE

BY Sughrue, Rothwell, Mion, Zinn & Macpeak

ATTORNEYS

FREQUENCY TRANSLATION ROUTING COMMUNICATIONS TRANSPONDER

BACKGROUND OF THE INVENTION

The invention is in the field of satellite transponders and specifically is a frequency translation routing transponder.

One technique for increasing information capacity per bandwidth in a communications satellite system is to incorporate multiple antennae on the satellite transponder for transmitting and receiving signals from designated areas on the earth. The beams, known as spot beams, provide spatial diversity and allow multiple communications within the same band. For example, if locations A, B, C and D were "illuminated" (covered by the beam pattern) by spot beams 1, 2, 3 and 4, respectively, a frequency channel occupied by communications from A to B could also be occupied by communications from C to D. This assumes that means are provided in the satellite to interconnect signals from receive beam 1 to transmit beam 2 and to interconnect signals from receive beam 3 to transmit beam 4.

For full capacity realization of a multi-spot beam system there should be means for adjustably interconnecting all or a portion of any receive beam bandwidth to any transmit beam. Such "switchboard" operation is not presently available.

SUMMARY OF THE INVENTION

In accordance with the present invention a multi-spot beam transponder is provided with means for connecting any band of any receive beam to any band of any transmit beam. The routing is accomplished by frequency translation. Each frequency band in each receive beam is translated into a separate frequency band thereby resulting in a total bandwidth after translation equal to the number of receive beams times the bandwidth per received beam. This total bandwidth is then divided, by filtering, into individual bandwidths suitable for transmitting. Before transmission the individual bandwidths are again frequency translated to provide the proper frequencies for transmission.

Translation of frequency bands in the received beams into selected frequency bands of said total bandwidth is accomplished by applying selected mixing frequencies or *l.o.* signals to mixers. The *l.o.* signals may be derived from a frequency synthesizer which generates a composite of all useful *l.o.* frequencies. The composite *l.o.* frequencies are power divided and passed through YIG filters which are electronically tuneable to select any *l.o.* frequency from all those in the composite signal. Each YIG filter output is connected to a single mixer for translating the receive frequencies.

DETAILED DESCRIPTION OF THE PREFERRED EMBODIMENT

In order to facilitate an understanding of the invention specific frequencies will be used in the description of the preferred embodiment, although the invention is not limited to the use of those specific frequencies or frequency bands. It is assumed that the satellite transponder of FIG. 1 receives three spot beams, each occupying the 5.9–6.4 GHz band, and transmits three spot beams each occupying the 3.7–4.2 GHz band. It is additionally assumed that 0.1 GHz or 100 MHz is the smallest bandwidth that may be separately routed. The receive spot beams are referred to as the A, B and C beams. The transmit beams are referred to as the AA, BB and CC beams.

Figure 1:
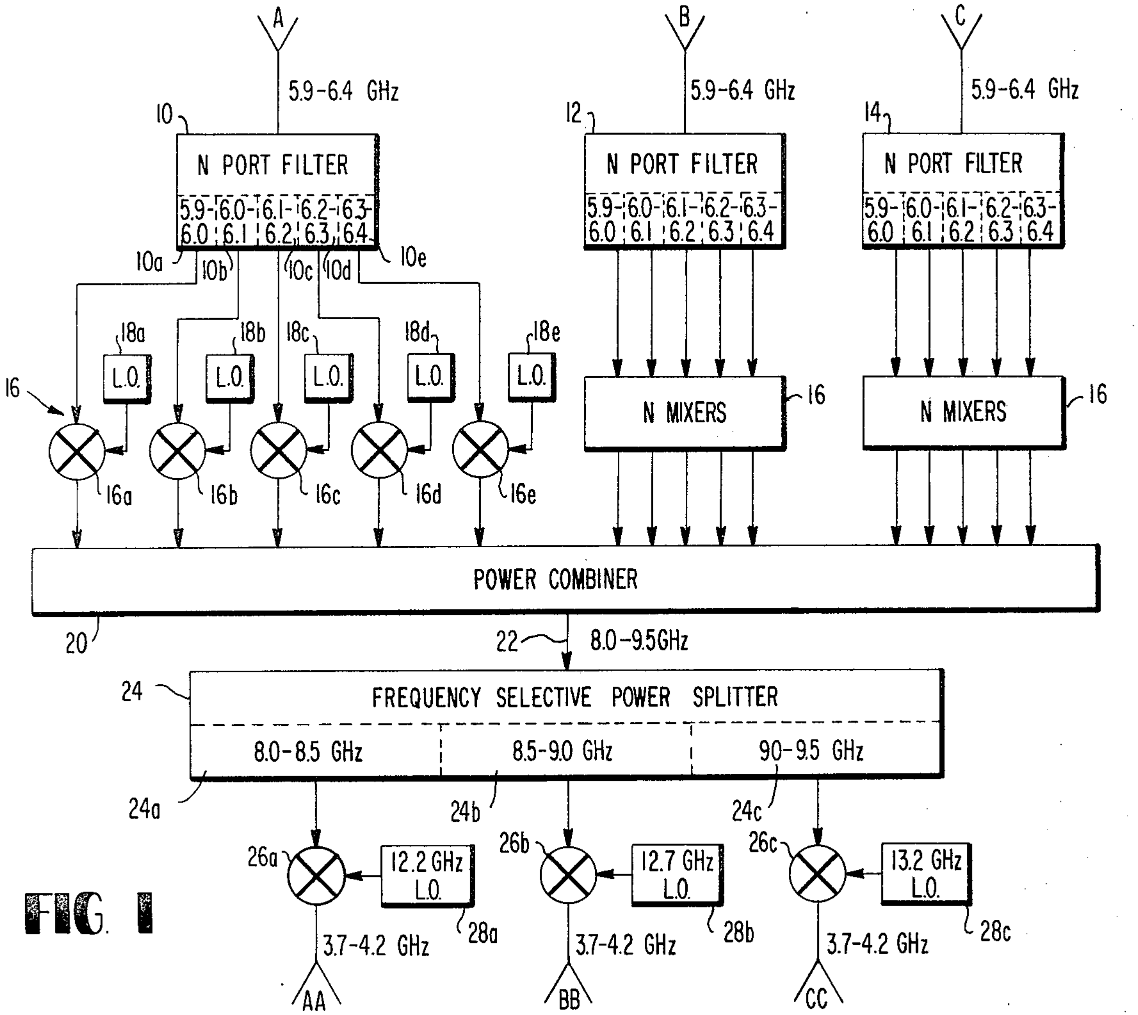
FIG. 1 is a block diagram of the frequency translation routing transponder.

Referring to FIG. 1, the receive beams are detected and their respective signals, each occupying the 5.9–6.4 GHz bandwidth, are applied to the N Port Filters, 10, 12 and 14, respectively. The signal appearing at the input of each filter, 10, 12 and 14, is a composite signal occupying the 5.9–6.4 GHz band of frequencies. In the example described N equals five. Each N Port Filter divides the beam bandwidth into frequency bands which may be individually routed (hereinafter referred to as band slots or slots). As illustrated each slot occupies a 100 MHz bandwidth between 5.9 and 6.4 GHz. Each band slot is applied to one of the mixers 16 and mixed with a local oscillator signal illustrated at 18. A different local oscillator frequency is applied to each mixer, and the frequencies are selected so that the fifteen slots from the three filters 10, 12 and 14 occupy all fifteen 100 MHz slots in a total band between 8.0 and 9.5 GHz.

The frequency translated slots are combined in a power combiner 20 resulting in a composite signal of bandwidth 8.0 to 9.5 GHz at the output 22. The composite signal is band filtered in the frequency selective power splitter 24 into 0.5 GHz bandwidth segments. As illustrated, there are three segments occupying the respective bands, 8.0–8.5 GHz, 8.5–9.0 GHz, and 9.0–9.5 GHz. Each of the segments is applied to one of the mixers *26a–26b* where it is mixed with a local oscillator frequency *28a–28c* to translate the segment into the transmit band, 3.7–4.2 GHz. The outputs of the mixers *26a–26c* are transmitted via the transmit beams AA, BB and CC respectively.

Routing is controlled by the *l.o.* frequency applied to the mixers 16. Assume, for example, that it is desired to transpond the 6.2–6.3 GHz slot in receive beam A on the 4.0–4.1 slot of the transmit beam BB. This routing is accomplished if the local oscillator frequency applied to mixer *16d* is 14.9 GHz. The frequency band occupied by the signal out of the mixer is 8.6–8.7 GHz. The latter slot is part of the 8.5–9.0 GHz bandwidth segment that is filtered through *24b* to mixer *26b* where it is mixed with a 12.7 GHz local frequency. The mixer translates the slot of interest into the 4.0–4.1 GHz band of the transmit beam BB.

The local oscillator frequencies on the receive side of the transponder could emanate from individual local oscillators, but weight considerations dictate a different technique for generating *l.o.* signals. Furthermore, it is preferrable to have variable *l.o.* signals thereby allowing for variation in the routing scheme.

Figure 2:
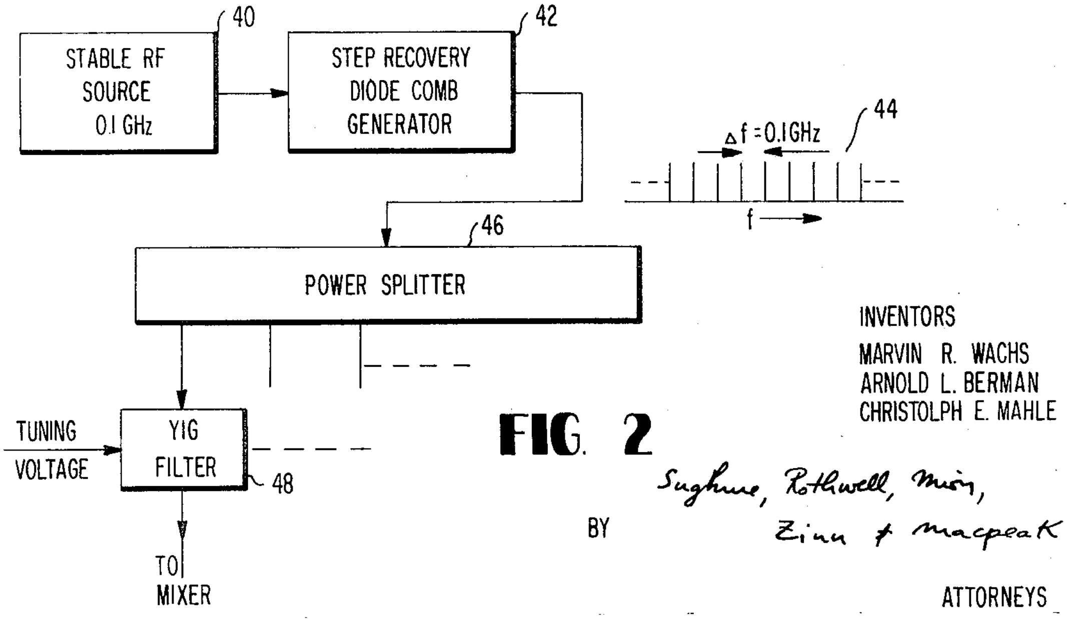
FIG. 2 is a block diagram of a frequency synthesizer for generating the local oscillator frequencies that are applied to mixers in the transponder.

One suitable frequency synthesizer is illustrated in FIG. 2 and comprises a stable frequency generator 40, a step recovery diode comb generator 42, a power divider 46, and a plurality of YIG filters, only one of which, 48, is shown. The source 40 generates a stable frequency at the lowest slot separation, which is 0.1 GHz, and the comb generator is an efficient harmonic generator. The frequency spectrum of the output from generator 42 is shown at 44. The output is effectively a plurality of *l.o.* frequencies separated by 0.1 GHz. The power splitter 46 operates in a well known manner to provide the same spectrum at reduced power at plural output ports. In this case there would be 15 output ports corresponding to the 15 mixers on the receive side of the transponder.

Each output port of power divider 46 is connected to a YIG filter, only one of which is shown. The output of each YIG filter is connected to a particular one of the mixers to provide the *l.o.* signal to the mixer. YIG filters are well known in the art as lightweight, electronically tuneable, high-Q filters. The value of the tuning voltage controls the center frequency of the YIG filter bandwidth, and thus the desired *l.o.* frequency may be passed to any mixer by properly setting the tuning voltage for the YIG filter which is connected to the mixer.

Obviously, if the tuning voltages are hand wired into the transponder the routing will be fixed. For variable routing the tuning voltages could simply be controlled by a digital processor which is either preprogrammed or responds to signals from the ground. As a simple example, a memory having fifteen digital word storage locations could be used. Each storage location would be connected to a digital to analog converter whose output would be the tuning voltage for one of the YIG filters. Variable routing could occur simply by altering the word stored in a storage location.

In the above description all slots were indicated as being of the same bandwidth. However, this is not necessary. The bandwidth of the slots may vary. The ability to route a slot to any transmit beam will be unaffected.

What is claimed is:

1. A frequency translation routing transponder comprising, a. means for receiving a plurality of composite signals each of said composite signals comprising a plurality of frequency slots occupying frequency bands which overlap the frequency bands occupied by other frequency slots in other ones of said plurality of composite signals, b. first translating means for translating each frequency slot within said plurality of composite signals into a separate, substantially non-overlapping, band of frequencies, c. filter means for separating the total frequency band occupied by said plurality of composite signals following said translation into separate frequency segments, and d. second translating means for translating each of said segments into a frequency band suitable for transmission, said suitable frequency bands overlapping in frequency.

2. A frequency translating routing transponder as claimed in claim 1 wherein said first translating means comprises, a. filter means for dividing said received plurality of composite signals into said frequency slots, b. means for generating a plurality of local oscillator frequencies, c. means for mixing selected local oscillator frequencies with the signals occupying said frequency slots to provide a total band of frequencies occupied by said plurality of composite signals with substantially no overlapping of frequencies.

3. A frequency translation routing transponder as claimed in claim 2 wherein said means for mixing comprises an individual mixer for each of said frequency slots, each of said mixers having the signals occupying a given frequency slot connected to one input thereof, and a local oscillator frequency connected to a second input thereof.

4. A frequency translation routing transponder as claimed in claim 3 wherein said means for mixing further comprises, a. power divider means connected to said generating means producing attenuated replica of said plurality of local oscillator frequencies at multiple output terminals, b. a plurality of electronically tuneable high-Q filters, each having its input connected to a respective one of said power divider outputs, and its output connected to the second input of a respective one of said individual mixers.

5. A frequency translation routing transponder as claimed in claim 4 wherein each of said electronically tuneable filters is a YIG filter.

* * * * *